United States Patent [19]

Pompéi Katz de Warrens

[11] Patent Number: 4,490,024
[45] Date of Patent: Dec. 25, 1984

[54] MULTICOMPONENT ELECTROLYTE WITH A DEFINITE POTENTIAL AND A DISPLAY CELL CONTAINING IT

[75] Inventor: Jean Pompéi Katz de Warrens, Noisy-le-Roi, France

[73] Assignee: Jaeger, Levallois Perret, France

[21] Appl. No.: 372,675

[22] Filed: Apr. 28, 1982

[30] Foreign Application Priority Data

Apr. 30, 1981 [FR] France .................. 81 08686

[51] Int. Cl.³ ........................... B02F 1/01; B02F 1/29
[52] U.S. Cl. ........................... 350/363; 252/518; 252/519; 252/520; 252/521; 252/600; 350/357; 429/199
[58] Field of Search ............... 350/363, 357; 252/62.2, 252/408.1, 518–521, 600; 264/194; 429/194, 197, 199

[56] References Cited

U.S. PATENT DOCUMENTS 4,240,717  12/1980  Camibel et al. ............... 350/363
4,361,386  11/1982  Meyer ........................ 350/363

FOREIGN PATENT DOCUMENTS 27755   4/1981  European Pat. Off.
128201  10/1980  Japan .................. 252/62.2

OTHER PUBLICATIONS

Camlibel et al., "An Experimental Display Structure Based on Reversible Electrodeposition", App. Phys. Lett., 11-1-79, pp. 793-794.

Primary Examiner—William H. Punter
Attorney, Agent, or Firm—Schwartz, Jeffery, Schwaab, Mack, Blumenthal & Koch

[57] ABSTRACT

A multicomponent electrolyte with a defined potential and a display cell containing it. The multicomponent, liquid electrolyte is based on at least one metal iodide dissolved in an anhydrous organic solvent, and is characterized in that it comprises three functional components: a first metallic element $M_p$ yielding at least two iodides corresponding to different valences, and which is intended to ensure an equilibrium between the reduced forms of iodine $I^-$ and $I_3^-$; an iodide of a second metal $M_f$ in a practically completely dissociated state, intended to fix the concentration of the anionic species $I^-$ in the electrolyte; and an iodide of a third metal $M_v$ constituting the display vehicle.

14 Claims, No Drawings

MULTICOMPONENT ELECTROLYTE WITH A DEFINITE POTENTIAL AND A DISPLAY CELL CONTAINING IT

The present invention concerns a novel liquid, multicomponent electrolyte with a definite potential, intended particularly for electrolytic display cells. The electrolyte according to the invention is of the general type based on at least one metal iodide dissolved in a preferably entirely anhydrous organic solvent.

The object of the present invention is the provision of an electrolyte with a definite potential to insure the execution of the following functions, in particular in a liquid electrolyte display device:

the selective deposition of one or several metals, simultaneously or not;

the dissolution of said metal deposit without causing iodide to appear in the course of the dissolution reaction;

obtain either a zero memory or an infinite memory of the display cell.

These different objectives have never been attained in the prior art. The present invention, in contrast, makes it possible to obtain perfectly satisfactory results by using multicomponent electrolytes with a definite potential, characterized in that it comprises the following three components, each being responsible for a highly specific function:

(a) a first metal element $M_P$ providing at least two iodides corresponding to different valences, thereby assuring the equilibrium between the reduced forms of the iode $I^-$ and $I_3^-$;

(b) an iodide of a second metal element $M_I$, present in a practically completely dissociated state, intended to set the concentration of the electrolyte in the anionic species $I^-$, and (c) an iodide of a third metal element $M_x$, constituting the display vehicle.

The metal element $M_P$ may be chosen from the group Tl, Cu, Hg, Au, Sn, Fe, Co, Ti, Cr, Mn, Sb and In.

The second metal element $M_I$ must have a positive ionization potential of the iodide $$\left(\frac{1}{i} \frac{E^0}{oy} > 0\right.$$

for a $M_y I_i$ iodide). The $M_I$ elements are more specifically chosen from the alkali and alkaline earth metals.

The third metal element $M_x$ may be chosen from among: Zn, Cd, Tl, Pb, Cu, Ag, Au, Sn, Fe, Ni, Co, Ti, Cr, Mn, Sb and In.

Further characteristics and advantages of the present invention will become apparent from the more detailed description of the invention hereinafter.

DETAILED DESCRIPTION OF THE PREFERRED EMBODIMENTS

The aforedefined multicomponent electrolyte may contain, depending on the respective values of the concentrations of the different components, three types of redox equilibria among the different ionized species and the undissociated iodides. These different equilibria shall be designated by $\alpha$, $\beta$ and $\gamma$, respectively. They cause oxidation and reduction reactions leading respectively to the deposition of a metal and to its dissolution. An electrode potential designated respectively lettering potential ($E_W$) and obliterating potential ($E_d$), corresponds to each of these reactions. There exists, for each of the three redox equilibria between ionized species, an equilibrium between the element or elements to be deposited and the other components, ionized or in the iodide form, of the electrode, to which a memory potential or a floating electrode potential ($E^*_f$) corresponds. If this potential is selected as the reference, the lettering and obliterating voltages will be the differences of the corresponding electrode potentials. The sheets 1 to 3 attached at the end of the specification present the redox equilibria $\alpha$, $\beta$ and $\gamma$, with such notations being defined herein.

It is noted that the iodide $M_p I_k$ occurs on two levels: with its oxidized species to insure the equilibrium of the reduced species of the iodine ($I^-$ and $I_3^-$) on the one hand, in the nondissociated form in equilibrium with the components of the electrolyte other than $I^-$ and $I_3^-$, and the most highly oxidized form of $M_p$, on the other. The first equilibrium is a buffer equilibrium. Sheet No. 5 attached hereto, which is characteristic of the element $M_p$, presents the list of buffer equilibria associated with the different $M_p$ elements. They are divided into four categories according to the degree k of oxidation of the element $M_p$ in its iodide.

k = 1   first category: Tl, Hg, Cu, Au
k = 2   second category: Hg, Fe, Co, Cr, Mn, Sn, Ti
k = 3   third category: In, Sb, Ti
k = 4   fourth category: Ti Within a category, an element $M_p$ may have several buffer equilibria if it possesses a number of oxidation degrees greater than 2, such as Tl in the first and In in the third. If it has several iodides, it will have buffer equilibria belonging to several categories, such as titanium and mercury. The latter, however, may be considered as belonging to the second category by reason of the dimerization of the monovalent ion, but may be treated in the first category, as its two iodides have identical electrochemical characteristics. These equilibria play their part only when associated with the equilibrium between the iodide and its reduced species. The weight ratio $\delta$ between these two equilibria is set by the condition of electrical neutrality of each of the members of the buffer equilibrium.

The second equilibrium is a function equilibrium and permits a distinction of the three equilibria $\alpha$, $\beta$ and $\gamma$, among themselves.

In the second member of the functional equilibrium ($\alpha$), the $M_p I_k$ iodide is associated with the iodide of the element $M_I$ and the cation of the element $M_x$.

In the second member of the functional equilibrium ($\beta$), the iodide $M_p I_k$ is associated with the cations of the elements $M_I$ and $M_x$.

In the first member of the functional equilibrium ($\gamma$), the $M_p I_k$ iodide is associated with the element $M_x$ and the cation of the element $M_I$.

Furthermore, the reactions of lettering and obliteration may cause the passage of $M_p^{k+}$ into the elemental state and the most highly oxidized state without this appearing in the electrochemical balance.

The following three consequences are thus attained:

1. The scale of the electrode potentials may be modified with respect to those of reactions of electrolysis in the aqueous phase;

2. The Faraday reaction may be higher than 1 and different in lettering and in obliteration (case of the equilibrium $\beta$); and 3. Iodine no longer intervenes necessarily in the mechanism of display.

Mass action makes it possible to select the elements $M_p$ and $M_x$ in keeping with the type of functional equilibrium considered. ;p As the iodide of the element $M_i$ is practically completely dissociated, the most stable components are found in the same member of the functional equilibrium with it.

Thus for ($\alpha$), $M_pI_k$ and $M_x^j$ (j being the degree of oxidation of $M_x$)

for ($\beta$), $M_p^k$ and $M_xI_j$ for ($\gamma$), $M_p^k$ and $M_x^j$

This signifies that in equilibrium ($\alpha$) $M_pI_k$ is less dissociable than $M_xI_j$, in equilibrium ($\beta$) $M_xI_j$ is less dissociable than $M_pI_k$ and in equilibrium ($\gamma$) $M_xI_j$ and $M_pI_k$ are dissociable but less so than $M_iI_j$.

Finally, the combination of the components of the electrolyte of the invention must be such that the equilibrium of the electrolyte is stable, i.e. the entirety of the redox reactions taking place therein lead to a negative redox potential.

In the case of the buffer equilibria relative to the electrolytes of type ($\alpha$), ($\beta$) and ($\gamma$), the redox potential is $\omega\Omega_n\omega$ being the weight ratio of the buffer equilibrium to the functional equilibrium. It is determined by the number of I$^-$ ions released by the functional equilibrium. The sum of the I$^-$ ions released at the same time by the functional equilibrium and the iodine equilibrium is equal to $3\omega + \delta$. As $\delta$ is expressed as a function of $\omega$, the sum of the ions I$^-$ released is equal to $\mu\omega$, $\mu$ being an integer number characteristic of the buffer equilibrium ($\Omega_n$) and a function of the degrees of ionization k and z of the elements $M_p$. There are seven buffer equilibria, designated $\Omega_1$ to $\Omega_7$, on sheet No. 5.

Sheet No. 6 is a table of the values of the ionization potentials of the iodide of the entirety of the elements:

$M_i$ (T)

$M_x$ (X and $X_o$)

$M_p$ (P and $P_o$)

Sheet 6 also contains a $P_o$ listing, wherein the elements $M_p$ are classified by decreasing $\Omega_o$.

The only elements favoring the ($\alpha$), ($\beta$) and ($\gamma$) equilibria are Cr, In, Ti, Sn and Cu. Their $\Omega_o$ is positive, which signifies that the buffer equilibrium tends to stabilize the least oxidized species of the $M_p$ element and consequently to favor the complexing of the iodine in I$^-$.

In contrast, the $M_p$ elements with $\Omega_o < 0$ (Fe, Sb, Hg, Co, Tl, Au and Mn) tend to release the iodine. Thus, to control this release of the iodine, a reference electrode $M_R$ has been combined with them. There will therefore be an equilibrium established between said surface and its oxidized species (in the case of a metal surface) or its reduced species (in the case of metalloid such as iodine) on the one hand, and the species of the same sign of the buffer electrode, on the other. To assure electrical neutrality and that the potential of the surface be taken as the reference, it suffices that the weight ratio $\omega$ between the buffer equilibrium and the functional equilibrium be equal to 1. Such an electrode is designated an electrode of type ($\omega$) and is illustrated in sheet No. 4.

In this sheet attached hereto, concerning the ($\omega$) equilibrium, the reactions (0) and (1) correspond respectively to the buffer and functional equilibria of the electrolyte ($\omega$). Reactions (2) and (3) correspond to reactions with the reference electrode. Reactions (4) and (5) correspond to functional reactions or electrolytic reactions insuring the phenomenon of lettering. Reactions (6) and (7) also are functional reactions of electrolytic reactions intended to make possible the obliteration of the display. Finally, Reactions (8) and (9) are the redox equilibrium reactions respectively of lettering and obliteration.

The notation used in Sheets 1 to 4 is as follows: The element $M_p$ has two degrees of oxidation (z and k) and a single stable iodide $M_pI_k$. The element $M_i$ has a single degree of oxidation (l) and a single stable iodide $M_iI_l$. The element $M_x$ has a single degree of oxidation (j) and a single stable iodide $M_xI_j$.

In the functional equilibrium, the iodides are assigned integer coefficients:

p for $M_pI_k$ r for $M_xI_j$ s for $M_iI_l$, wherein m is the number of atoms of element $M_x$ in the oxidation and reduction reactions of lettering and obliteration, g is the number of electrons taking part in these reactions, m/r is the weight yield $\tau_m$ m/g is the Faraday yield $\tau_F$ The electrolyte is always characterized by a characteristic relationship between the coefficients $k_p$, sl, rj and $\mu\omega$, specified in each sheet. The functional reactions are symbolized by the general coefficient q.

The value of q for lettering is: a integer for the floating equilibrium: b positive-integer for obliteration: c positive-integer For the equilibrium ($\omega$) 2 q is an integer number.

Standard potentials are noted:

$E^o_e$ for the redox $E^o_q$ for the electrode potentials and more precisely, $E^o_f$ for the floating electrode.

In the case of each type of equilibrium, the redox potential corresponding to the functional equilibria $\Phi$ (e) must be negative. In Sheet 7, all of the conditions that must be satisfied to obtain equilibria of type ($\alpha$), ($\beta$), ($\gamma$) and ($\omega$) are grouped together.

The entirety of the buffer and functional equilibria creates an overall redox equilibrium having a defined standard potential and a negative value. This is the electrolyte potential $E^o_e$.

For the equilibria ($\alpha$), ($\beta$) and ($\gamma$) there exists, in addition to the electrolyte potential $E^o_e$, another redox potential designated $E^o_f$ which corresponds to the standard potential of an electrode $M_x$ submerged in the electrolyte. $E^o_f$ is also called the floating potential or memory potential.

Concerning the equilibrium ($\omega$), there are two redox equilibria, one corresponding to lettering of potential $(\omega)_n$ and the other to obliteration of potential $(d)_n$. A neutral potential $V_L$ is further defined, for which there is no lettering or obliteration, the value of which is:

$$V_L \left( \frac{(\omega)_n + (d)_n}{2} \right)$$

In order to facilitate the determination of these potentials, the differences of the ionization potentials are listed as follows:

Ionization potential of element $M_y$:

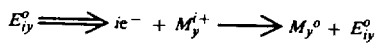

$$E^o_{iy} \Longrightarrow ie^- + M_y^{i+} \longrightarrow M_y^o + E^o_{iy}$$

Ionization potential of the iodide of element $M_y$:

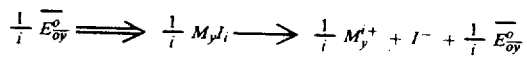

$$\frac{1}{i}\overline{E^o_{oy}} \Longrightarrow \frac{1}{i} M_y I_i \longrightarrow \frac{1}{i} M_y^{i+} + I^- + \frac{1}{i}\overline{E^o_{oy}}$$

There is also defined a potential $E_I$ corresponding to the reaction $$2e^- + I_3^- \longrightarrow 3I^- + EI^o$$

$$EI^o = +0.5336 \text{ Volt}$$

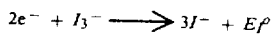

$$\left.\begin{array}{l}\overline{E_{\overline{px}}} = \frac{i}{j}\overline{E^o_{ox}} - \frac{i}{k}\overline{E^o_{op}} = -\overline{E_{\overline{xp}}} \\ \overline{E_{\overline{ip}}} = \frac{i}{k}\overline{E^o_{op}} - \frac{i}{l}\overline{E^o_{oT}} = -\overline{E_{\overline{pT}}} \\ \overline{E_{\overline{xT}}} = \frac{1}{l}\overline{E^o_{oT}} - \frac{1}{j}\overline{E^o_{ox}} = -\overline{E_{\overline{Tx}}}\end{array}\right\} \overline{E_{\overline{px}}} + \overline{E_{\overline{ip}}} + \overline{E_{\overline{xT}}} =$$

$$\overline{E_{\overline{Tx}}} - \overline{E_{\overline{pT}}} - \overline{E_{\overline{xp}}} = 0$$

With the aid of these new notations, Sheet 7 may be simplified in the manner indicated in the following table.

| | -continued | | |
|---|---|---|---|
| | Sheet 8 | Sheet 9 | Sheet 10 |
| $P_a^+$ | | | |
| T | $(\overline{E_{\overline{Ip}}})_\omega$ | $(\overline{E_{\overline{Ip}}})_a$ | $\overline{E_{\overline{Ix}}}$ |

The potentials of the electrodes for writing and for obliteration at the writing and obliterating level are listed respectively:

(w)$_E$ writing (lettering) potential of the element $M_x$
(d)$_E$ obliterating potential of the element $M_x$
(w)$_R$ writing potential of the reference electrode
(d)$_R$ obliterating potential of the reference electrode In the absence of a reference electrode, the internal writing and obliterating voltages, respectively $V_w$ and $V_d$, are as follows:

$$V_w = (d)_E - (w)_E = -V_d$$

In the presence of a reference electrode, the following relationships exist:

$$V_w = (d)_R - (w)_E$$

$$V_d = (w)_R - (d)_E$$

$$V_w + V_d = [(w)_R + (d)_R] - [(w)_E + (d)_E] = (\overline{O}) -$$
$$(\overline{O}) = O$$

In the case on an electrolyte of type $(\alpha)$, $(\beta)$ or $(\gamma)$, one can take as a reference electrode an electrode com-

TABLE I

| e | $(\alpha)$ | $(\beta)$ | $(\gamma)$ | $(\omega)$ |
|---|---|---|---|---|
| $E^o_\phi(e) < 0$ | $\omega u\overline{E_{\overline{px}}} + slj\overline{E_{\overline{ip}}} < 0$ | $-\omega u\overline{E_{\overline{ip}}} + rj\overline{E_{\overline{Ix}}} < 0$ | $\omega u\overline{E_{\overline{ip}}} + rj\overline{E_{\overline{Ix}}} < 0$ | $slj\overline{E_{\overline{Ix}}} < 0$ |
| $\Omega_n < 0$ | $-\omega\Omega_o < 0$ | $-\omega\Omega_o < 0$ | $-\omega\Omega_o < 0$ | $mq\Omega_o < 0$ |
| $E^o_e < 0$ | $\omega(u\overline{E_{\overline{px}}} - \Omega_o) + slj\overline{E_{\overline{ip}}} < 0$ | $-\omega(u\overline{E_{\overline{ip}}} + \Omega_o) + rj\overline{E_{\overline{Ix}}} < 0$ | $\omega(u\overline{E_{\overline{ip}}} - \Omega_o) + rj\overline{E_{\overline{px}}} < 0$ | $slj\overline{E_{\overline{Ix}}} + V_\zeta =$ |
| | | | | $u\omega\overline{E_{\overline{Ix}}} + mq\Omega_o < 0$ |
| $E^o_f(e) < 0$ | $\omega(u\overline{E_{\overline{px}}} - \Omega_o) + slj$ | $\omega(-u\overline{E_{\overline{ip}}} - \Omega_o) + rj$ | $\omega(u\overline{E_{\overline{ip}}} - \Omega_o) + rj$ | $(w)_o =$ |
| | $(E^o_{jx} + \overline{E_{\overline{ip}}}) < 0$ | $(E^o_{jx} + \overline{E_{\overline{Ix}}}) < 0$ | $(E^o_{jx} + \overline{E_{\overline{px}}}) < 0$ | $V_\zeta + slj(\overline{E_{\overline{Ix}}} + E^o_{jx} - E^o_f)$ |
| | | | | $< 0$ |
| $\overline{E^o_f}(e) < 0$ | | | | $(d)_o =$ |
| | | | | $V_\zeta - slj(\overline{E_{\overline{Ix}}} + E^o_{jx} - E^o_f)$ |
| | | | | $< 0$ |

Sheet Nos. 8 to 10 mention the different values of the ionization potential of iodide in the following arrangement:

| | Sheet 8 | | Sheet 9 | | Sheet 10 | |
|---|---|---|---|---|---|---|
| $M_y$ | $P_\omega^-$ | $P_\omega^+$ | $P_\alpha^-$ | $P_\alpha^+$ | $X^-$ | $X^+$ |
| $E^o_{iy}$ | | | | | | |
| $\frac{1}{y}\overline{E^o_{oy}}$ | | | | | | |
| $P_\omega^-$ | $(\overline{E_{p\omega}})_\omega$ | | $(\overline{E_{p\alpha}})_\omega$ | | $(\overline{E_{px}})_\omega$ | |
| $P_\omega^+$ | | | | | | |
| $P_\alpha^-$ | $(\overline{E_{p\omega}})_\alpha$ | | $(\overline{E_{p\alpha}})_\alpha$ | | $(\overline{E_{\overline{px}}})_\alpha$ | | prising a metal $M_x$, or a previous deposit of $M_x$ on any electrode. In such a case the potential of the electrode corresponds to the floating potential or memory potential.

The internal voltages of the lettering and of the obliteration are noted respectively:

$V_{w/f}$ and $V_{d/f}$ in regard to a floating electrode
$V_{w/Pt}$ and $V_{d/Pt}$ in regard to a platinum electrode
$C_x$, concentration of iodide of the element $M_x$
$\overline{C_x}$, limiting concentration of iodide of the element $M_x$ The rest of the notation conforms to the notation usually employed in electrochemistry.

Internal voltages of writing and obliteration

If one commences with monomolecular iodide solutions of $M_i$ and $M_p$, the following relationships are obtained:

$$V_{w/i} = E_i'' + \frac{r_i}{r_m} \frac{RT}{F} \log C_s$$

$$V_{d/i} = E_i' - E_i'' - \frac{r_i}{r_m} \frac{RT}{F} \log C_s$$

The limiting concentration $C_s$ corresponds to the equalization of the writing and obliterating voltages ($V_{w/i} = V_{d/i}$):

$$\log C_s = \frac{F}{RT} \frac{r_m}{r_i} (E_{M_i}'' - E_i')$$

as $$E_i' = E_{M_i}'' + r \frac{RT}{F} \log C_s$$

The following is then obtained:

$$V_{w/i} - V_{w/i} = (E_{P_i}'' - E_{M_i}'') - \left(\frac{r_i}{r_m} - r\right) \frac{RT}{F} \log C_s$$

$$V_{d/i} - V_{d/i} = (E_{P_i}'' - E_{M_i}'') + \left(\frac{r_i}{r_m} + r\right) \frac{RT}{F} \log C_s$$

In order to deposit or obliterate an element $M_x$ in a display cell, it is necessary to apply between the two electrodes an emf at least equal to, but of the opposite sign from the internal voltages of writing and obliteration defined hereinabove. There is a galvanic correspondence between the current passing through the cell and the thickness of the deposit, which is expressed as follows:

$$q = it = c_1 \frac{s \cdot e \cdot d}{A_x}$$

with:
i: the density of the display current in $mA/cm^2$
s: the surface to be covered in $cm^2$
e: the thickness of a deposit in Å assumed to be identical with the solid metal
d: the density of $M_x$ in the solid state
t: the time of deposition
$A_x$: the atomic mass of $M_x$ and $p$ its valence In the case of an equilibrium of the type ($\omega$), an overvoltage may have to be overcome:

$$S = (w)_R - (d)_R$$

The multicomponent electrolytes according to the invention of type ($\alpha$), ($\beta$) and ($\gamma$) have redox or electrolyte potentials that are predefined, in view of the fact the the average value of the electric charges in each of the members of the overall redox equilibrium of the electrolyte is zero. The density of the volume charge of the electrolyte medium is thus equipotential and its potential may be taken as a reference, regardless of the nature, of the electrodes and their relative disposition. If the electrodes are of the same nature, the phenomena of lettering and obliteration depend only on the potential difference applied to them, regardless of their relative disposition. They may be arranged in particular in a coplanar manner, as set forth in more detail in a copending application of the present applicant. Furthermore, the Faraday yield may be higher than or equal to 1, resulting in an appreciable reduction in the consumption of current. Still further, the electrolytes $\alpha$, $\beta$, and $\gamma$ according to the invention provide buffer electrodes to complex the iodine, which thus does not interfere with the display mechanism.

The electrolytes of type ($\alpha$), ($\beta$), and ($\gamma$) according to the invention further make it possible to obtain a polychrome system of display corresponding to the deposition of elements with well differentiated colors, separately or simultaneously.

By way of illustration, certain examples of the $M_x$ elements are mentioned, together with their color of display.

| | |
|---|---|
| Au | yellow |
| Ag, Ti, Pb | black |
| Cd | clear gray |
| Zn | |

In addition, by causing each metallic element to play the role of the deposable element ($M_x$), it is possible to known for a given combination the number of distinct iodides present in the electrolyte and thus to establish a scale of writing potentials relative to each element, whereby each of the elements may be deposited and obliterated in a selective manner. It is also possible to deposit two or more elements simultaneously, as the deposition yield per electron may be higher than 1, thereby making it possible in this manner to obtain shades of color. By utilizing the color of the colored background in the case of direct vision ambient illumination, with filtered or polarized light in the case of a transparent rear face, a multicolored display with good contrast may be obtained.

When the potential differences of lettering do not permit selective deposition, it is possible to act on the initial and limiting concentration to efface a color prior to making another one appear, thereby to have a fade-out or a degradation of the display.

To effect of such a predetermined, multicolor display, it is possible to determine the functional equilibria for a given $M_p$ element, by virtue of the values provided in Sheets 8 to 10, knowing that the element $M_i$ may be chosen in the group T and the elements $M_x$ in groups X and $P_\omega$.

In contrast, the elements $M_p$ must necessarily yield a buffer equilibrium with the same weight factor $\omega$, because of the interaction between the functional equilibrium and the buffer equilibrium.

Concerning the electrolyte $\omega$, interaction will be produced between the buffer equilibrium and the reference electrode.

The mechanisms of the multicolor display will be controlled by the position of the lettering and obliteration levels with respect to the corresponding level of the reference electrode on the one hand, and the neutral potential $V_L$, on the other. In contrast to the electrolytes of type ($\alpha$), ($\beta$) and ($\gamma$), here it is feasible to mix several $M_p$ elements to adjust the different potentials.

As the limiting concentrations are also linked to the existence of this $V_L$ potential, the latter becomes the essential parameter of the display.

In the case of an electrode of type (ω), the elements $M_t$ may be chosen from the group T, the elements $M_p$ from the group $P_o$ and the elements $M_x$ from the group X and P. In this particular case, an important supplemental color, i.e. red will be available, if $M_x$ is copper. The entirety of the equilibria of type (ω) is characterized by a weight factor between the functional equilibria and the buffer equal to unity.

The following Table II lists examples of elements capable of entering the composition of electrolytes of type (ω) according to the invention, together with reference electrodes able to take an indifferent potential, are given.

TABLE II

|    | $M_p$ | $M_t$ | $M_x$ | $E_R$ |
|----|-------|-------|-------|-------|
| Ca |       | x     |       |       |
| K  |       | x     |       |       |
| U  |       | x     |       |       |
| Zn |       | x     | x     |       |
| Cd |       | x     | x     |       |
| Tl | x     | x     | x     |       |
| Pb |       | x     | x     |       |
| Cu | x     | x     | x     |       |
| Ag |       | x     | x     | x     |
| Hg | x     | x     | x     | x     |
| Au | x     | x     | x     | x     |
| Pt |       |       |       | x     |
| Be |       | x     |       |       |
| Mg |       | x     |       |       |
| Li |       | x     |       |       |
| Na |       | x     |       |       |
| Sn |       | x     | x     |       |
| Fe | x     | x     | x     |       |
| Ni |       | x     | x     |       |
| Co | x     | x     | x     |       |
| Ti |       | x     | x     |       |
| Cr |       | x     | x     |       |
| Mn | x     | x     | x     |       |
| Sb |       | x     | x     |       |
| In |       | x     | x     |       |

The neutral potential $V_\xi$ is proportional to the buffer potential. It is thus possible to determine it in an electrolyte with n components $M_0, M_1, M_2, \ldots M_{n-1}$, comprising a single component 1 that is purely $M_t$, i.e. $M_0$, and r elements capable of acting as $M_p: M_1 \ldots M_r (r > 1)$.

All of the elements $M_m$ ($1 \leq m \leq n-1$) may be considered to be $M_x$.

1—Determination of buffer potentials $\Omega_o$

Let us consider the entirety of the functional lettering elemental equilibria $\omega_i$ relative to an element $M_p$. The overall equilibrium with respect to a weight factor $\omega = 1$ is noted:

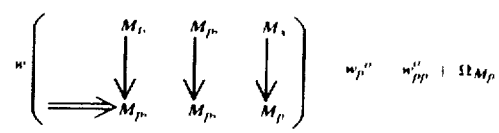

$w''_{pp}$ at the resultant of the functional elemental reactions of lettering $\Omega_p$ at the reaction between oxidized species of the element $M_p$ in the buffer equilibrium $w''_p$ lettering level of the element $M_p$ The potential of the buffer equilibrium, in view of the different factors $\delta$ and $\omega$ associated with the elemental equilibria is equal to:

$$\Omega_{op} = \Omega_{M_p} + \Omega_{I_p}$$

$$\Omega_{I_p} = 2E_I - 2\left(\frac{\Sigma_{I_{\omega}} E_{I0}}{\Sigma_{\omega}}\right)$$

or $$E_{I0} = +0.0024\,V - 1 + (I_2 - I_x)$$

$$E_I = +0.5336\,V - 2e + (I_x - M)$$

For an electrolyte with n components, the potential $\Omega_o$ is equal to:

$$\Omega_o = \frac{1}{r} \sum_{p=1}^{p=r} \Omega_{op}$$

The following Table III gives the standard internal voltages of lettering relative to an electrolyte (ω) comprising gold as the $M_p$ element and silver as the $M_x$ element, for different possible $M_t$ elements (K, Na, Li, Be, Mg and Ca) and for different possible references electrodes (Ag, $I_2$, Pt and Au).

TABLE III

| $\Omega_o$ | 1.5128 | $M_x$ | $M_t$ |       | K      | Na       | Li     | Ca     | Mg      | Be      |
|------------|--------|-------|-------|-------|--------|----------|--------|--------|---------|---------|
| n = 3      | $M_p$  | Ag    | $W_t''$ |     | 0.0584 | 0.2003   | 0.7098 | 0.9792 | 1.9686  | 2.1530  |
| $M_R$      | Au     |       | $d_t''$ |     | 2.2108 | 2.0689   | 0.9843 | 3.5592 | 2.5698  | 2.3854  |
| Ag         | Au     | Ag    | $d_R''$ |     |        | 0.5320   |        |        | 0.5320  |         |
|            |        |       | V     |       |        | 1.1346   |        |        | 2.2692  |         |
|            |        |       | $W_R''$ |     |        | 1.7332   |        |        | 4.0064  |         |
|            |        |       | S     |       |        | 1.2012   |        |        | +3.4744 |         |
|            |        |       | V     |       | 0.4736 | 0.3317   | 0.1778 | +0.4472 | +1.4366 | +1.6220 |
| Pt         | Au     | Ag    | $d_R''$ |     |        | 1.3328   |        |        | 1.3328  |         |
|            |        |       | V     |       |        | 1.1346   |        |        | 2.2692  |         |
|            |        |       | $W_R''$ |     |        | 0.9364   |        |        | 3.2056  |         |
|            |        |       | S     |       |        | 0.3964   |        |        | +1.8728 |         |
|            |        |       | V     |       | 1.2744 | 1.1324   | 0.6230 | 0.3536 | +0.6358 | +0.8202 |
| Au         | Au     | Ag    | $(d_R'')$ |   |        | ( 1.9028) |        |        | ( 1.9028) |         |
|            |        |       | V     |       |        | 1.1346   |        |        | 2.2692  |         |
|            |        |       | S     |       |        | 0        |        |        | 0       |         |
|            |        |       | V     |       | 1.0762 | 0.9343   | 0.4248 | 2.1554 | 1.1660  | 0.9816  |
| $I_2$      | Au     | Ag    | V     |       |        | 1.1346   |        |        | 2.2692  |         |
|            |        |       | $(W_R'')$ |   |        | ( 0.0072) |        |        | ( 0.0072) |         |
|            |        |       | S     |       |        | 0        |        |        | 0       |         |
|            |        |       | V     |       | 1.0762 | 0.9343   | 0.4248 | 2.1554 | 1.1660  | 0.9816  |

The lettering and obliterating potentials of the element $M_x$ are determined by the standard potentials and the concentration of the iodide of the element $M_x$ in the electrolyte (ω) considered.

The lettering and obliterating potentials of the reference electrode are also calculated from the standard potentials of the electrode in the electrolyte considered, but also from the charge developed in the operations of lettering and obliterating. This charge is expressed in terms of variations of the concentration of the oxidized or reduced species, if such species pre-exist in the electrolyte, or in terms of potential variations in electrochemical correspondence, if the reference electrode does not contain elements existing in the electrolyte or solubilized by it. Silver, iodine and gold electrodes are found in the first case and a platinum electrode in the second.

The memory of the cell is defined by the ability of a deposit to remain written in a liquid electrolytic display. This memory may be static and is then measured by the time elapsing between the instant when the writing voltage ceases to be applied and the instant when the deposit experiences an appreciable loss of contrast, or it may be dynamic. In the latter case, it is expressed by the duration of the current pulse during which the electrode writes, passes through a maximum contrast, and is then entirely obliterated. The characteristic of the dynamic memory is proper to the platinum electrode and is distinct from the static memory. A deposit may be obliterated in dynamic memory in a fraction of a second and have a permanent static memory.

The latter in effect depends only on the level of potentials attained at the end of writing. A deposit of the elements $M_i$ is theoretically at the end of lettering at the lettering level in the electrolyte $(w)_L$, but isolated it tends to take on the lettering potential that would be assumed by a reference electrode consisting of the same element in the electrolyte at the equilibrium $(w)_{R}$. However, if it is potential, evolving from $(w)_L$ to $(w)_{R}$ passes the value of the level of the potential $(d)_R$ corresponding to the reference electrode in the electrolyte considered, the deposit tends to be obliterated. The memory will thus depend on the capacity of the electrode/electrolyte interface and the difference in level between $(w)_L$ on the one hand, and $(d)_R$ and $(w)_R$ on the other. To determine whether the memory is permanent or infinite, it suffices to observe the following relation between the standard potentials $(d)^\circ_R - (w)^\circ_L$.

Thus, for the $(\omega)$ electrolyte considered (gold, silver, $M_i$) and a silver reference electrode, the memory is permanent when $M_i$ is selected from among Ca, La, Be and Mg, while it is nonpermanent with K and Na, but better for Na than for K.

In these two latter cases, an effect of the electrodes on the phenomenon of memory is observed with a silver reference electrode. The memory will vary with $(d)_R$, if in the vicinity of the deposit local disequilibria of the electrolyte are created (reduction of the memory of an operating display).

The short circuiting of the deposit with the counter electrode of the cell make it possible to avoid the obliteration of the display, provided that the internal impedance of the electrode on which the deposit is located is sufficient so that the flow of the charges through the cell will raise the potential of the counter electrode more rapidly than it lowers that of the deposit, so that the counter electrode attains its obliterating level. This thus corresponds to maintaining a lettering potential.

With a gold reference electrode, the memory becomes permanent. In effect, a gold electrode will modify the concentrations of the species of the buffer equilibria so that its potential becomes equal to the neutral potential $V_L$.

The case of platinum is special. In static memory, its action is double. Since there are practically no $Pt^{++}$ ions in the electrolyte, it will act on the electrolyte so as to take a neutral potential. The result is an equality of the potentials between the reactions of the species of the same sign of the buffer equilibrium. This will lead to an evolution of the ratio of the concentrations $Au^{+++}/Au^+$ and $(I^-)^3/I_3$. As the concentration of $(I^-)$ is fixed, the variation of the concentration in $I_3^-$ will be reflected in the equilibrium of the iodine in solution $I^- + I_2 \rightarrow I_3^-$ and the iodine will precipitate or rather pass into a colloidal solution. Concerning a previously deposited $M_i$ deposit, the preceding case is repeated. The static memory is generally permanent.

It should be noted that the difficulty of passing platinum into solution is the origin of the phenomenon of the dynamic memory when a lettering voltage is applied.

The charge applied to the electrolyte will cause simultaneously the deposition of the element $M_i$ and the rise in the potential of the platinum electrode, the Faraday equivalent of the charge injected, translated into terms of the potential. As a result, the potential of the deposit will attain the level of the obliterating potential of the element $M_i$ in the electrolyte $(d)_L$ and will be obliterated.

In order to extend the dynamic memory at an equal charge, the concentration of the iodide of the $M_i$ element must be reduced or the volume of the cell must be increased.

In a general manner, so that a reference electrode be at rest with a neutral potential, it is necessary that $$d_R^\circ = w_R^\circ$$

$$w_{RH}^\circ = \varepsilon + \frac{1}{\varepsilon}\sum_{p=1}^{p=z}z u_p, \quad w_{RR}^\circ = x_0 + \frac{1}{\varepsilon}\sum_{p=1}^{p=z}z u_p$$

$$d_{RH}^\circ = V_L$$

The iodine is always at a neutral potential. The excess iodine passes into a colloidal solution and does not intervene in the buffer equilibrium.

The case of the elements of the reference electrode capable of entering the composition of the electrolyte.

The minimum neutral potential is that of cobalt. Only gold has a lower obliterating potential. Electrodes containing silver or mercury may attain a higher $V_L$ potential respectively at $-0.5320$ and $0.7068$ V. The other electrodes have a positive obliterating potential and may have a neutral potential only in electrolytes containing at least one of the following elements: copper, chromium, tin, titanium, indium. This is a necessary but not a sufficient condition.

Concerning electrodes comprising no elements available in the electrode, several possibilities exist.

The electrode does not contain a known iodide (platinum, for example)

When a quantity of electricity $q$ (coulomb) is injected in an electrochemical cell of volume $v$ (liter), having a platinum reference electrode playing the role of the counter electrode, the potential of the latter is increased by a quantity $$\Delta E_R = \frac{RT}{2F} \log [Pt^{2+}]$$

There is a Faraday correspondence between the molality $[Pt^{2+}]$ (mole/liter) of the platinum passing into solution and the charge q injected:

$$[Pt^{2+}] = 0.19734 \frac{q}{v}$$

thus, $\Delta E_R = 0.02956 \frac{T}{298} \left[ 0.70474 + \log\left(\frac{q}{v}\right) \right]$ Let $(V_\zeta)_E$ be the neutral potential of the electrolyte. The charge q will create lettering reactions in the electrolyte ($\omega$), while $$d_{Pt}'' + \Delta E_R < (V_\zeta)_E \quad 20$$

When the potential of platinum attains the neutral potential, i.e. when the quantity of electricity attains the value $q_o$ so that $$\log(q_o) = \frac{10^4}{T} (1.3328 + (V_\zeta)_E) - 0.70474 + \log(v)$$

the process is reversed, the platinum is redeposited and the excess quantity of electricity causes obliterating reactions to occur (dynamic memory). In contrast, when the platinum electrode no longer serves as the counter-electrode, its potential ($d°_{Pt}$) serves as the reference for the electrolyte ($\omega$), and a return to the case of the electrolytes ($\alpha$, $\beta$, $\gamma$) takes place, without using iodine. The static memory is generally permanent.

Gold electrode

The gold electrode, both as the counter-electrode and the reference electrode, is at the neutral potential of the electroyte with n components, if gold is one of them; if not, at the neutral potential of an electrolyte with (n+1) components, comprising the initial electrode plus gold. The limiting concentrations of the oxidized species of gold are so low that there is a deposition of gold in solution in the first case and nonappreciable dissolution of the electrode in the second. By definition, the eventual passage from the neutral potential to the potential of deposition, from $W_{EX}$ to $W_{RX}$, does not cause obliterating reactions. The static memory is thus permanent.

The case of electrodes comprising elements solubilizable by the electrode but in an insoluble form (such as oxides)

The problem is the same as in the case of platinum (overvoltage when writing layers of oxides of tin-antimony) but it is more difficult to handle with respect to the determination of the concentration of solubilized elements and consequently the electrode potentials. These concentrations are obtained by equating the chemical potentials of the elements considered in the electrode and in the electrolyte.

If the electrolytes do not contain $M_p$ elements, they may still be considered ($\omega$) electrolytes with respect to electrodes containing solubilizable $M_p$ elements. These elements are characterized by a negative neutral potential; they are Hg, Au, Fe, Co, Sb.

If the electrodes contain nonsolubilizable $M_p$ elements, they attain the neutral potential of the electrolyte ($\omega$).

The overvoltage appearing during lettering between an electrode with q solubilizable $M_{ps}$ elements and a metal counter-element R immersed in an electrolyte ($\omega$) is:

$$S = \frac{r(V_\zeta)_E + \Sigma(V_\zeta)_{ps}}{r+q} - d_R''$$

The corresponding buffer potential $$\Omega_o = \frac{r\Omega_o + z \Sigma(V_\zeta)_{ps}}{r+q}$$

The symbols $M_{ps}$ represent the solubilizable $M_p$ elements of the electrode which do not exist in the electrolyte.

An electrode with solubilizable $M_p$ elements may be useful in view of electrolytes without $M_p$ elements. However, the overvoltage may induce the dissolution of the $M_p$ element of the electrode especially at low temperatures, because the difference between the overvoltage and the standard obliterating potential corresponding to an $M_p$ element (solubilizable) of the electrode is constant and equal to $$\frac{RT}{zF} \log (M_p^{z+})$$

If T decreases, $\log (M_p^{z+})$ will increase to the detriment of the surface of the electrode, which will be degraded in an irreversible manner.

It will be recalled that all of the multicomponent electrolytes which are the object of the present invention are characterized by the existence of a well defined electrolyte potential. In the case of electrolytes of types ($\alpha$), ($\beta$) and ($\gamma$), this potential is defined by the complexing equilibrium of iodine, while in the case of the type ($\omega$) electrodes, the potential is determined by the reference electrode having a definite electrochemical nature.

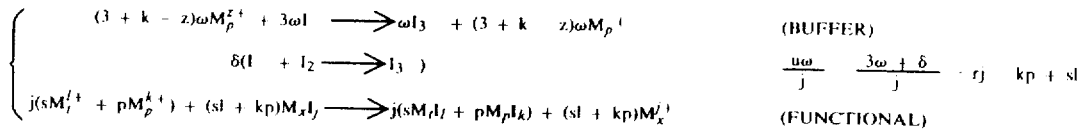

EQUILIBRIA (a)

$$\begin{cases} (3 + k - z)\omega M_p^{z+} + 3\omega I^- \longrightarrow \omega I_3 + (3 + k - z)\omega M_p^+ & \text{(BUFFER)} \\ \delta(I^- + I_2 \longrightarrow I_3^-) \\ j(sM_I^{j+} + pM_p^{k+}) + (sl + kp)M_xI_y \longrightarrow j(sM_II_l + pM_pI_k) + (sl + kp)M_x^{z+} & \text{(FUNCTIONAL)} \end{cases}$$

REACTIONS (a)

-continued $$jqM_p^o + [3 + k - z)\omega - jq]M_p^{z+} + 3\omega I^- \longrightarrow \omega I_3^- + (3 + k - z)\omega M_p^+ + zjqe^-$$

$$j(sl + kq)e^- + j(sM_t^{l+} + pM_p^{k+}) + (sl + kp)M_xI_j \longrightarrow [(kgM_xI_j + j(sM_tI_l + (p - q)M_pI_k)] + slM_x^o + jqM_p^o + k(p - q)M_x^{j+}$$

| WEIGHT YIELD | CHARACTERISTIC RELATIONSHIP $kp = rj - sl$ | | FUNCTIONS |
|---|---|---|---|
| $m = rj - kp$ | FUNCTIONAL COEFFICIENTS | $q = a \quad g < o \Longrightarrow w$ | WRITING |
| $m = sl$ | $q = \dfrac{sl}{z - k} + \dfrac{q}{j(z - k)} \Longrightarrow$ | $q = b \quad g = o \Longrightarrow f$ | MEMORY |
| | | $q = c \quad g > o \Longrightarrow d$ | OBLITERATION |
| | $(z - k)(a + b + c) = 3sl = 3(rj - kp)$ | FARADAY YIELD | |
| $\dfrac{m}{r} = j - \dfrac{kp}{r} \leq$ | $c \leq (3 + k - z)\dfrac{\omega}{j}$ | $\left\|\dfrac{m}{g}\right\| = \dfrac{sl}{j(z - k)}$ | |
| $1 \Longrightarrow kp \geq r(j - 1)$ | $c \leq pk$ | $\dfrac{m}{g} \geq 1 \Longrightarrow r \geq j(z - k)$ | |
| | $kp \geq j(j - 1)(z - k) \quad g = \pm j(z - k)$ | | |

EQUILIBRIA (β)

$$\begin{cases} (3 + k - z)\omega M_p^{z+} + 3\omega I^- \longrightarrow \omega I_3^- + (3 + k - z)\omega M_p^+ & \text{(BUFFER)} \\ \delta(I^+ - I_2 \longrightarrow I_3^-) & u\omega = 3\omega + \delta = sl + rj = kp \\ pM_p^{k+} + rM_xI_j + sM_tI_l \longrightarrow pM_pI_k + sM_t^{l+} + rM_x^{j+} & \text{(FUNCTIONAL)} \end{cases}$$

REACTIONS (β)

$$jqM_p^o + [(3 + k - z)\omega - jq]M_p^{z+} + 3\omega I^- \longrightarrow \omega I_3^- + (3 + k - z)\omega M_p^+ + zjqe^-$$

$$rje^- + pM_p^{k+} + rM_xI_j + sM_tI_l \longrightarrow (p - jq)M_pI_k + kqM_xI_j + sM_t^{l+} + (r - k - q)M_x^o + jqM_p^o$$

| WEIGHT YIELD | CHARACTERISTIC RELATIONSHIP $kp = rj - sl$ | | FUNCTIONS |
|---|---|---|---|
| $m = r - kg$ | FUNCTIONAL COEFFICIENTS | $q = a \quad g < o \Longrightarrow w$ | WRITING |
| $m = r\left(\dfrac{z - k}{z}\right) - \dfrac{kg}{jz}$ | $q = \dfrac{rj + g}{jz} \Longrightarrow$ | $q = b \quad g = o \Longrightarrow f$ | MEMORY |
| | | $q = c \quad g > o \Longrightarrow d$ | OBLITERATION |
| $\dfrac{(m)}{r} w = \dfrac{z - k}{z} + \dfrac{k}{r} \leq$ | $z(a + b + c) = 3r = \dfrac{3(kP - sl)}{j}$ | FARADAY YIELD | |
| $1 \Longrightarrow r \geq \dfrac{z}{z - k}$ et $kp \geq \dfrac{zj}{z - k} + sl$ | $c \leq (3 + k - z)\dfrac{\omega}{j}$ | $\dfrac{(m)}{g} w = \dfrac{1}{zj}\left[r\dfrac{(z - k)}{z} + k\right] \geq$ | |
| | $c \leq pk$ | | |
| $\dfrac{(m)}{r} d = \dfrac{z - k}{z} - \dfrac{k}{r}$ | $g = \pm jz$ | $1 \Longrightarrow r \geq \dfrac{z}{z - k}(k + zj)$ | |
| | | $\dfrac{(m)}{g} d = \dfrac{1}{zj}\left[r\dfrac{(z - k)}{z} - k\right]$ | |

EQUILIBRIA (γ)

$$\begin{cases} (3 + k - z)\omega M_p^{z+} + 3\omega I^- \longrightarrow \omega I_3^- - (3 + k - z)\omega M_p^{k+} & \text{(BUFFER)} \\ \delta(I^- + I_2 \longrightarrow I_3^-) & u\omega = 3\omega + \delta = sl = rj + kp \\ sM_t^{l+} + rM_xI_j + pM_pI_k \longrightarrow sM_tI_l + rM_x^{j+} + pM_p^{k+} & \text{(FUNCTIONAL)} \end{cases}$$

REACTIONS (γ)

$$jqM_p^o + [(3 + k - z)\omega - jq]M_p^{z+} + 3\omega I^- \longrightarrow \omega I_3^- + (3 + k - z)\omega M_p^+ + zjqe^-$$

$$j(r + kq)e^- + sM_t^{l+} + rM_xI_j + pM_pI_k \longrightarrow sM_tI_l + rM_x^o + jqM_p^o + (p - jq)M_p^{k+}$$

| WEIGHT YIELD | CHARACTERISTIC RELATIONSHIP $kp = rj - sl$ | FUNCTIONS |
|---|---|---|

-continued

| | FUNCTIONAL COEFFICIENTS | | |
|---|---|---|---|
| $m = r$ | | $q = a \quad g < o \Longrightarrow w$ | WRITING |
| $m = \dfrac{sl - kp}{j}$ | $q = \dfrac{kp + g}{j(z + k)} \Longrightarrow$ | $q = b \quad g = o \Longrightarrow f$ | MEMORY |
| | | $q = c \quad g > o \Longrightarrow d$ | OBLITERATION |
| $\dfrac{m}{r} = 1$ | $j(z + k)(a + b + c) = 3kp = 3(sl - rj)$ | | |
| | $c \leqq (3 + k - z)\dfrac{\omega}{j}$ | FARADAY YIELD | |
| | $c \leqq \dfrac{pk}{j}$ | $\dfrac{m}{g} = \dfrac{r}{j(z + k)}$ | |
| | $g = j(z + 1)$ | $\dfrac{m}{g} \geqq 1 \Longrightarrow r \geqq j(z + k)$ | |

EQUILIBRIA ($\omega$)

(Electrode de reference en $M_R^o$)

$$(3 + k - z)\omega M_p^{z+} + 3\omega I^- \longrightarrow \omega I_3^- + (3 + k - z)\omega M_p^{k+} \tag{0}$$

$$jsM_t^{l+} + slM_xI_j \longrightarrow jsM_tI_l + slM_x^{j+} \tag{1}$$

$$(3 + k - z)m[M_p^{k+} + (z - k)M_R^{m+} \longrightarrow (z - k)M_R^o + mM_p^{z+}] \tag{2}$$

$$2M_R^o + mI_3^- \longrightarrow 3mI^- + 2M_R^{m+} \tag{3}$$

$$slje^- + jsM_t^{l+} + slM_xI_j \longrightarrow slM_x^o + sjM_tI_l \tag{4}$$

$$qM_R^o \longrightarrow qM_R^{m+} + mqe^- \tag{5}$$

$$jsM_tI_l + slM_x^o \longrightarrow slM_xI + jsM_t^{l+} + slje^- \tag{6}$$

$$mqe^- + qM_R^{m+} \longrightarrow qM_R^o \tag{7}$$

$$3\omega + \delta = slj = mq$$

$$(w)_o \Longrightarrow \left[(3 + k - z)M_p + \frac{1}{l}M_t^{l+} + \frac{1}{j}M_xI_j\right] mq \longrightarrow mq\left[\frac{1}{j}M_x^o + \frac{1}{l}M_tI_l + (3 + k - z)M_p^{z+}\right] \tag{8}$$

$$(d)_o \Longrightarrow \left[I_3^- + \frac{1}{l}M_tI_l + \frac{1}{j}M_x^o\right] mq \longrightarrow mq\left[\frac{1}{j}M_xI_j + \frac{1}{l}M_t^+ + 3I^-\right] \tag{9}$$

$(w)_o + (d)_o = mq\Omega_o$

| BUFFER EQUILIBRIA | | | | | | | | | | | | |
|---|---|---|---|---|---|---|---|---|---|---|---|---|
| by iodine release | by iodine complexing | Buffer | $\Omega_n$ | | $3\omega + \delta$ | k | 1 | 2 | 3 | 4 | $P_o$ | |
| $\Omega_n \quad \Omega_o < 0$ | $\Omega_o < 0$ | Potential | n | $\delta$ | $= u\omega$ | z | − + | − + | − + | − + | | P |
| $2\omega M_p^{2+} + 3\omega I^- \longrightarrow \omega I_3^- + 2\omega M_p^+$ | | | | | | | | | | In | | + |
| $\Omega_1$ | | $-\omega\Omega_o$ | 1 | $\omega$ | $4\omega$ | 2 | | | | | | |
| | $\delta(I_2 + I^- \longrightarrow I_3^-)$ | | | | | | Hg Cu<br>Tl | | | | | − |
| $2\omega M_p^{2+} + 3\omega I^- \longrightarrow \omega I_3^- + \omega((M_p)_2)^{2+}$ | | | | | | | | | | | | + |
| $\Omega_2$ | | $-\omega\Omega_o$ | 2 | $\omega$ | $4\omega$ | 2 | | | | | | |
| | $\delta(I_2 + I^- \longrightarrow I_3^-)$ | | | | | | | Hg$_2$ | | | | − |
| $\omega M_p^{3+} + 3\omega I^- \longrightarrow \omega I_3^- + \omega M_p^+$ | | | | | | | | | | In | | + |
| $\Omega_3$ | | $-\omega\Omega_o$ | 3 | 0 | $3\omega$ | 3 | | | | | | |
| | $\delta(I_2 + I^- \longrightarrow I_3^-)$ | | | | | | | Au<br>Tl | | | | − |
| $2\omega M_p^{3+} + 3\omega I^- \longrightarrow \omega I_3^- + 2\omega M_p^{2+}$ | | | | | | | | | Fe Ti<br>Co | Ti<br>In | | + |
| $\Omega_4$ | | $-\omega\Omega_o$ | 4 | $3\omega$ | $6\omega$ | 3 | | | Mn | | | |
| | $\delta(I_2 + I^- \longrightarrow I_3^-)$ | | | | | | | | Tl | Cr | | − |

-continued $$\Omega_5 \quad \omega M_p^{4+} + 3\omega I^- \longrightarrow \omega I_3^- + \omega M_p^{2+} \quad -\omega\Omega_o \quad 5 \quad \omega \quad 4\omega \quad 4 \quad \text{Ti} \quad \text{Ti} \quad +$$

$$\delta(I_2 + I^- \longrightarrow I_3^-) \quad \text{Sn} \quad -$$

$$\Omega_6 \quad 2\omega M_p^{4+} + 3\omega I^- \longrightarrow \omega I_3^- + 2\omega M_p^{3+} \quad -\omega\Omega_o \quad 6 \quad 5\omega \quad 8\omega \quad 4 \quad \text{Ti} \quad \text{Ti} \quad +$$

$$\delta(I_2 + I^- \longrightarrow I_3^-) \quad -$$

$$\Omega_7 \quad \omega M_p^{5+} + 3\omega I^- \longrightarrow \omega I_3^- + \omega M_p^{3+} \quad -\omega\Omega_o \quad 7 \quad 2\omega \quad 5\omega \quad 5 \quad \text{Sb} \quad +$$

$$\delta(I_2 + I^- \longrightarrow I_3^-) \quad -$$

| | | $M_R$ | | $M_t$ | | $M_p$ | | | | $M_x$ | | | | | | | |
|---|---|---|---|---|---|---|---|---|---|---|---|---|---|---|---|---|---|
| $\frac{1}{i}\overline{E^o_{\partial y}}$ | i | M | l | T | k | P | $P_a$ | u | $P_\omega$ | j | X | $X_a^+$ | j | $X_a^-$ | $X_\omega^-$ | j | $X_\omega$ | $X_o$ | $-E^o_{mR}$ | m | n | $\Omega_o$ | $P_o$ |

| | | | | | | | | | | | | | | | | | | | | | | +3,272 | Cr |
| | | | | | | | | | | | | | | | | | | | | | | +2,624 | Co |
| | | | | | | | | | | | | | | | | | | | | | | +1,954 | In |
| +1,1385 | 2 | Be | | | 2 | Be | | | | | | | | | | | | Ti | +1,753 | 3 | 3 | | In |
| +1,1322 | 3 | Ti | | | 3 | Ti | | | | | | | Ti | 3 | | | | Ti | +1,626 | 2 | 1 | | In |
| +1,0463 | 2 | Mg | 2 | Mg | | | | | | | | | | | | | | Mn | +1,029 | 2 | 4 | +1,7062 | Ti |
| +0,8490 | 2 | Ti | | | 2 | Ti | | | | | | | Ti | 2 | | | | Ti | +0,9797 | 4 | 5 | | Ti |
| +0,7720 | 1 | Li | 1 | Li | | | | Ti | 6 | | | | | | | | | Zn | +0,763 | 2 | 6 | | Ti |
| +0,5514 | 2 | Ca | 2 | Ca | | | | | | | | | | | | | | | | | | 5 | +0,7552 | Sn |
| +0,4096 | 4 | Ti | | | 4 | Ti | | | | | | | Ti | 4 | | | | Cr | +0,557 | 2 | 1 | +0,7488 | Cu |
| +0,3208 | 2 | Ni | | | | | | | | 2 | Ni | Ni | 2 | | | Ni | 2 | Fe | +0,409 | 2 | | | |
| +0,2945 | 2 | Fe | | | 2 | Fe | | 6 | Fe | | | Fe | 2 | | | | | Cd | +0,403 | 2 | | | |
| +0,2790 | 2 | Mn | | | 2 | Mn | | 6 | Mn | | | Mn | 2 | | | | | In | +0,338 | 3 | | | |
| +0,2619 | 1 | Na | 1 | Na | | | | | | | | | | | | | | Tl | +0,336 | 1 | | | |
| +0,2430 | 2 | Co | | | 2 | Co | | 6 | Co | | | Co | 2 | | | Co | 2 | Co | +0,280 | 2 | | | |
| +0,2143 | 2 | Zn | | | | | | | | 2 | Zn | Zn | 2 | | | Zn | 2 | Ni | +0,230 | 2 | | | |
| +0,1204 | 1 | K | 1 | K | | | | | | | | | | | | | | Sn | +0,1364 | 1 | | | |
| +0,0771 | 3 | In | | | 3 | In | | In | 4,17 | | | | | | | In | 3 | Pb | +0,126 | 2 | | | |
| +0,0022 | 3 | Sb | | | 3 | Sb | | 5 | Sb | | | | | | | | | Sn | +0,007 | 4 | | | |
| | | | | | | | | | | 3 | Sb | | | | | | | | | | | | |

| $M^+$ | | T | | $P^+$ | | $P_a^+$ | | $P_\omega^+$ | | $X^+$ | | | | | $X_o^-$ | | | | $P_o^+$ |
|---|---|---|---|---|---|---|---|---|---|---|---|---|---|---|---|---|---|---|---|
| o | | o | | o | | o | | o | | o | o | o | o | o | o | | | | o |

| $M^-$ | | | | $P^-$ | | $P_a^-$ | | $P_\omega^-$ | | $X^-$ | | | | | $X_o^+$ | | | | $P_o^-$ |
|---|---|---|---|---|---|---|---|---|---|---|---|---|---|---|---|---|---|---|---|
| | | | | | | | | | | | | | | | | | | | −2,6240 Co |
| −0,0325 | 2 | Cr | | | 2 | Cr | | Cr | 6 | | | | | Cr | 2 | Sb | −0,210 | 3 | |
| −0,0736 | 2 | Sn | | | 2 | Sn | | Sn | 4 | | | | | Sn | 2 | Cu | −0,340 | 2 | |
| −0,1016 | 2 | Cd | | | | | | | | 2 | Cd | Cd | 2 | Cd | 2 | | | 4 | −0,360 Fe |
| −0,2390 | 2 | Pb | | | | | | | | 2 | Pb | Pb | 2 | Pb | 2 | Sb | −0,420 | 5 | 7 | −0,4076 Sb |
| −0,4163 | 1 | Tl | | | 1 | Tl | | 4,17 | Tl | | | Tl | 1 | | | Cu | −0,522 | 1 | |
| −0,7073 | 1 | Cu | | | 1 | Cu | | Cu | 4 | | | | | | | Tl | −0,719 | 3 | |
| −0,8925 | 2 | Hg | | | 2 | Hg | | | | | | | | | | Ag | −0,7996 | 1 | 1 | |
| −0,9464 | 2 | Hg$_2$ | | | 2 | Hg$_2$ | | 4 | Hg | | | | | 2 | Hg | Hg | −0,850 | 2 | 2 | −0,5252 Hg |
| −0,9515 | 1 | Ag | | | | | | | | 1 | Ag | | | 1 | Ag | 1 | Ag | Hg$_2$ | −0,905 | 2 | 1 | Tl |
| −0,1450 | 1 | Au | | | 1 | Au | | 3 | Au | | | | | 1 | Au | Pt | −1,20 | 2 | 3 | |
| | | | | | | | | | | | | | | | | Tl | −1,264 | 2 | 4 | −1,4286 Tl |
| | | | | | | | | | | | | | | | | Au | −1,42 | 3 | 3 | −1,5123 Au |
| | | | | | | | | | | | | | | | | Au | −1,68 | 1 | 4 | −1,9604 Mn |

| Electrolyte (e) | Functional equilibria $\phi(e)$ | Buffer equilibria $\Omega_n$ | Characteristic relations | Equilibrium potential of the electrolyte functions "writing," "memory," "obliteration" |
|---|---|---|---|---|
| ($\alpha$) | $j\left(\frac{rj}{j}\overline{E^o_{ox}} - \frac{pk}{k}\overline{E^o_{\partial p}} - \frac{sl}{l}\overline{E^o_{\partial p}}\right) =$ $pjk\left(\frac{1}{j}\overline{E^o_{\partial x}} - \frac{1}{k}\overline{E^o_{\partial p}}\right) +$ $slj\left(\frac{1}{j}\overline{E^o_{\partial x}} - \frac{1}{l}\overline{E^o_{\partial r}}\right)$ $= E_\phi^o(\alpha) < O$ | Buffer equilibria by iodine complexing $\Omega_o = 2E_I +$ $(3 + k - z)[kE^o_{kp} - zE^o_{zp}]$ $\Omega_o > O$ | $u\omega$ $= \frac{\omega}{2}[(3 + k - z)(k + z) + 2]$ $= rj^2$ $= j(sl + kp)$ | $E_\alpha^o = E_\phi^o(\alpha) -$ $\omega\Omega_o < O$ $E_f^o(\alpha) = E_\alpha^o +$ $sljE^o_{jx} < O \Longrightarrow f$ $w > f > d$ |
| ($\beta$) | $\frac{rj}{j}\overline{E^o_{\partial x}} - \frac{pk}{k}\overline{E^o_{\partial p}} + \frac{sl}{l}\overline{E^o_{\partial r}} =$ | Buffer equilibria by iodine complexing $\Omega_o = 2E_I +$ | $u\omega$ $= \frac{\omega}{2}[(3 + k - z)(k + z) + 2]$ | $E_\beta^o = E_\phi^o(\beta) -$ $\omega\Omega_o < O$ $E_f^o(\beta) = E_\beta^o +$ |

-continued $$rj\left(\frac{1}{j}\overline{E^o_{ox}} - \frac{1}{k}\overline{E^o_{op}}\right) +$$

$$sl\left(\frac{1}{l}\overline{E^o_{oT}} - \frac{1}{k}\overline{E^o_{op}}\right)$$

$$= E_\phi{}^o(\beta) < O$$

$(3 + k - z)[kE^o_{kp} - zE^o_{zp}]$
$\Omega_o > O$ $= kp$
$= rj + sl$ $rjE^o_{jx} < O \Longrightarrow f$
$w > f > d$ (γ)

$$\frac{rj}{j}\overline{E^o_{ox}} - \frac{pk}{k}\overline{E^o_{op}} + \frac{sl}{l}\overline{E^o_{oT}} =$$

$$rj\left(\frac{1}{j}\overline{E^o_{ox}} - \frac{1}{l}\overline{E^o_{oT}}\right) +$$

$$pk\left(\frac{1}{k}\overline{E^o_{op}} - \frac{1}{l}\overline{E^o_{oT}}\right)$$

$$= E_\phi{}^o(\gamma) < O$$

Buffer equilibria
by iodine complexing
$\Omega_o = 2E_I +$
$(3 + k - z)[kE^o_{kp} - zE^o_{zp}]$
$\Omega_o > O$ $u\omega$
$= \frac{\omega}{2}[(3 + k - z)(k + z) + 2]$
$= sl$
$= kp + rj$ $E_\gamma{}^o = E_\phi{}^o(\gamma) -$
$\omega\Omega_o < O$
$E_f^o(\gamma) = E_\gamma{}^o +$
$rjE^o_{jx}$
$w > f > d$ (ω)

$$\frac{sjl}{j}\overline{E^o_{ox}} - \frac{sjl}{l}\overline{E^o_{oT}} =$$

$$= slj\left(\frac{1}{j}\overline{E^o_{ox}} - \frac{1}{l}\overline{E^o_{oT}}\right) =$$

$E_\phi{}^o(\omega) < O$ $\frac{1}{j}\overline{E^o_{ox}} > \frac{1}{l}\overline{E^o_{oT}}$ Buffer equilibria controlled by reference electrode
$\Omega_M = 2E^o_{mR} +$
$m(3 + k - z)[kE^o_{kp} - zE^o_{zp}]$
$\Omega_I = -2E^o_{mR} + 2mE_I$
$\Omega_M < O, \Omega_I < O$
$\Omega_M + \Omega_I = m\Omega_o < O$ $u\omega$
$= \frac{\omega}{2}[(3 + k - z)(k + z) + 2]$
$= slj$
$= 2mq$
$= g$ $\tau_F = \frac{1}{j}$ $E_\omega{}^o = E_\phi{}^o(\omega) +$
$mq\Omega_o < O$
$(w)_o = E_\omega{}^o +$
$sljE^o_{jx} - 2mqE_I < O$
$(d)_o = -E_\omega{}^o - sljE^o_{jx} +$
$2mqE_I + mq\Omega_o < O$ $(w)_o + (d)_o =$
$mq\Omega_o = 2V_l < O$
$(d)_o - (w)_o =$
$2[(V_l - E_\omega{}^o) +$
$slj(E^o_{jx} - E_f^o)]$

| $M_y$ | | Au | Hg | Tl | Sb | Mn | Fe | |
|---|---|---|---|---|---|---|---|---|
| | $E^o_{iy}$ | +1,42 | +0,850 | +0,719 | 0,420 | −0,1826 | −0,036 | |
| | | +1,68 | +0,905 | +1,264 | +0,210 | −0,029 | −0,409 | |
| | | | | −0,336 | | | | |
| | $\frac{1}{i}\overline{E^o_{oy}}$ | −1,1450 | −0,9464 | −0,4163 | +0,0022 | +0,2780 | +0,2945 | |
| Au | −1,1450 | (+2,9700) | +0,1980 | +0,7282 | +1,1472 | +1,4230 | +1,4395 | |
| Hg | −0,9646 | −0,1986 | (+1,7740) | +0,5301 | +0,9486 | +1,2244 | +1,2409 | 1 |
| Tl | −0,4163 | −0,7287 | −0,5301 | (+1,0098) | +0,4185 | +0,6943 | +0,7108 | 2 |
| Sb | +0,0022 | −1,1466 | −0,9486 | −0,4185 | (+0,6825) | +0,2802 | +0,2967 | 1 |
| Mn | +0,2780 | −1,4230 | −1,2241 | −0,6943 | −0,2758 | (−0,7884) | +0,0165 | 3 |
| Fe | +0,2945 | −1,4396 | −1,2409 | −0,7108 | −0,2933 | −0,0165 | (−0,2585) | 2 |
| Cu | −0,7073 | −0,4377 | −0,2371 | +0,2910 | +1,4145 | +0,9853 | +1,0018 | 2 |
| Sn | −0,0736 | −0,0714 | −0,8728 | −0,3427 | +0,0714 | +0,3516 | +0,3681 | 1 |
| Cr | −0,0325 | −1,1125 | −0,9139 | −0,3838 | +0,0303 | +0,3105 | +0,3270 | 2 |
| In | +0,0771 | −1,2291 | −1,0295 | −1,1873 | −0,0893 | +0,2005 | +0,2174 | 3 |
| Co | +0,2430 | −1,3880 | −1,1894 | −0,6523 | −0,2452 | +0,0350 | +0,0515 | 2 |
| Ti | +0,6383 | −1,7833 | −1,5847 | −1,0546 | −0,6405 | −0,3603 | −0,3438 | 2 |
| | | | | | | | | 3 |
| | | | | | | | | 4 |
| K | +0,1204 | −1,2654 | −1,0668 | −0,5367 | −0,1182 | +0,0740 | +0,1741 | 1 |
| Na | +0,2619 | −1,4069 | −1,2083 | −0,6782 | −0,2597 | +0,0161 | +0,0226 | 1 |
| Ca | +0,5514 | −1,6964 | −1,4978 | −0,9677 | −0,5492 | −0,2734 | −0,2669 | 2 |
| Li | +0,7726 | −1,9170 | −1,7184 | −1,1883 | −0,7698 | −0,4940 | −0,4775 | 1 |
| Mg | +1,0463 | −2,1913 | −1,9927 | −1,4626 | −1,0041 | −0,7683 | −0,7518 | 2 |
| Be | +1,1385 | −2,2835 | −2,0849 | −1,5548 | −1,1363 | −0,8605 | −0,8440 | 2 |
| k(z)j | 1-(3) | 1-(2) | 1-(2-3) | 3-(5) | 2-(3) | 2-(3) | | |
| u | 3 | 4 | 4,176 | 5 | 6 | 6 | | |
| m | 1 | 1 | 1 | 1 | 1 | 1 | | |
| mq | 1,5 | 2 | 1,5 | 3 | 2 | 2 | | |
| $\Omega_M$ | +0,3900 | +0,1650 | −1,4832 | −0,7875 | −3,8088 | −1,6785 | | |
| $\Omega_I$ | −1,9028 | −0,6902 | +0,0546 | −0,4353 | −0,1120 | +0,9585 | | |
| $u\Omega_o$ | −4,5384 | −2,1008 | −5,9666 | −2,0380 | −11,7624 | −2,1600 | | |
| $E^o_{jx} - E_f^o$ | −2,2692 | −1,0504 | −2,9833 | −3,0570 | −5,8812 | −1,0800 | | |

| $M_y$ | | Cu | Sn | Cr | In | Co | Ti | |
|---|---|---|---|---|---|---|---|---|
| | $E^o_{iv}$ | +0,340 | +0,0068 | −0,740 | −0,338 | +0,4273 | −0,9797 | |
| | | +0,522 | −0,1364 | −0,557 | −0,262 | −0,280 | −1,753 | |
| | | | | | −0,124 | | −1,626 | |
| | $\frac{1}{i}\overline{E^o_{oy}}$ | −0,7073 | −0,0736 | −0,0325 | +0,0771 | +0,2430 | +0,6383 | |
| Au | −1,1450 | +0,4977 | +1,0714 | +1,1125 | +1,2221 | +1,3880 | +1,7833 | 1 |

-continued

|    |         |           |           |           |         |         |           |       |
|----|---------|-----------|-----------|-----------|---------|---------|-----------|-------|
| Hg | −0,9464 | +0,2591   | +0,8728   | +0,9139   | +1,0235 | +1,1894 | +1,5847   | 2     |
| Tl | −0,4163 | −0,2910   | +0,3427   | +0,9838   | +0,4963 | +0,6593 | +1,0546   | 1     |
| Sb | +0,0022 | −0,7095   | −0,0758   | −0,0347   | +0,0749 | +0,2408 | +0,6361   | 3     |
| Mn | +0,2780 | −0,9853   | −0,3436   | −0,3105   | −0,2009 | −0,0350 | +0,3603   | 2     |
| Fe | +0,2945 | −1,0018   | −0,3681   | −0,3270   | −0,2176 | −0,0515 | +0,3438   | 2     |
| Cu | −0,7073 | (+0,8690) | +0,6337   | +0,6748   | +0,7844 | +0,9503 | +1,3456   | 1     |
| Sn | −0,0736 | −0,6337   | (−0,0819) | +0,0410   | +0,1507 | +0,3166 | +0,7119   | 2     |
| Cr | −0,0325 | −0,6745   | −0,0411   | (−1,3885) | +0,1096 | +0,2750 | +0,6708   | 2     |
| In | +0,0771 | −0,7841   | −0,1507   | −0,1096   | (+0,1925) | +0,1659 | +0,5612 | 3     |
| Co | +0,2430 | −0,9503   | −0,3160   | −0,2755   | −0,1650 | (−0,5010) | +0,3953 | 2     |
| Ti | +0,6383 | −1,3456   | −0,7119   | −0,4155   | −0,5612 | −0,3953 | (−2,2055) | 2 3 4 |

|    |         |         |         |         |         |         |         |   |
|----|---------|---------|---------|---------|---------|---------|---------|---|
| K  | +0,1204 | −0,8277 | −0,1940 | −0,1529 | −0,0433 | +0,1226 | +0,5179 | 1 |
| Na | +0,2619 | −0,9692 | −0,4559 | −0,2944 | −0,1848 | −0,0189 | +0,3764 | 1 |
| Ca | +0,5514 | −1,2587 | −0,6250 | −0,5839 | −0,4743 | −0,3084 | +0,0869 | 2 |
| Li | +0,7726 | −1,4793 | −0,8456 | −0,8045 | −0,6949 | −0,5290 | −0,1337 | 1 |
| Mg | +1,0463 | −1,7536 | −1,1199 | −1,0788 | −0,9692 | −0,8033 | −0,4080 | 2 |
| Be | +1,1385 | −1,8458 | −1,2121 | −1,1710 | −1,0614 | −0,8955 | −0,5002 | 2 |

|                     |         |         |         |         |         |         |         |
|---------------------|---------|---------|---------|---------|---------|---------|---------|
| $k(z)j$             |         | 1-(2)   | 2-(4)   | 2-(3-1) | 3-(2-1) | 2-(3)   | 2-3-4   |
| u                   |         | 4       | 4       | 6       | 4,176   | 6       | 6       |
| m                   |         | 1-2     | 2-4     | 2       | 3       | 2 3     | 2-3-4   |
| mq                  |         |         |         |         |         |         |         |
| $\Omega_M$          | +0,5460 | −0,3819 | +0,8235 | +0,3667 | −3,1829 | −1,5587 |         |
| $\Omega_f$          | +0,2028 | +1,8923 | +5,7165 | +5,4925 | +0,5591 | +4,9711 |         |
| $u\Omega_o$         | +0,0116 | +3,0208 | +19,632 | +5,862  | −15,744 | +10,2372|         |
| $E^o_{jx} - E_f^o$  | −0,0116 | −0,6700 | −1,0906 | −0,8716 | −0,8136 | −1,5133 |         |

| $M_y$            | Ag      | Pb      | Cd      | Zn      | Ni      |
|------------------|---------|---------|---------|---------|---------|
| $E^o_{jy}$       | +0,7956 | −0,126  | −0,403  | −0,763  | −0,2336 |
| $\frac{1}{1} \overline{E^o_{oy}}$ | −0,9595 | −0,2390 | −0,1016 | +0,2143 | +0,3208 |

|    |         |         |         |         |         |         |
|----|---------|---------|---------|---------|---------|---------|
| Au | −1,1450 | +0,1855 | +0,9060 | +1,6434 | +1,3593 | +1,4658 |
| Hg | −0,9464 | −0,0131 | +0,7074 | +0,8448 | +1,1607 | +1,2672 |
| Tl | −0,4163 | −0,5432 | +0,1773 | +0,3147 | +0,6306 | +0,7371 |
| Sb | +0,0022 | −0,9617 | −0,2412 | −0,1038 | +0,2121 | +0,3186 |
| Mn | +0,2780 | −1,2375 | −0,5176 | −0,3796 | −0,0637 | +0,0428 |
| Fe | +0,2945 | −1,2540 | −0,5335 | −0,3961 | −0,0802 | +0,0263 |

|    |         |         |         |         |         |         |
|----|---------|---------|---------|---------|---------|---------|
| Cu | −0,7073 | −0,2522 | +0,4683 | +0,6058 | +0,9216 | +1,0281 |
| Sn | −0,0736 | −0,8859 | −0,1654 | −0,0279 | +0,2879 | +0,3944 |
| Cr | −0,0325 | −0,9270 | −0,2065 | −0,0690 | +0,8468 | +0,3533 |
| In | +0,0771 | −1,0366 | −0,3161 | −0,1787 | +0,1392 | +0,2437 |
| Co | +0,2430 | −1,2025 | −0,4820 | −0,2446 | −0,0287 | +0,0778 |
| Ti | +0,6383 | −1,5978 | −0,8773 | −0,7459 | −0,4240 | −0,3175 |

|    |         |         |         |         |         |         |
|----|---------|---------|---------|---------|---------|---------|
| K  | +0,1204 | −1,0799 | −0,3594 | −0,2220 | +0,0939 | +0,2004 |
| Na | +0,2619 | −1,2214 | −0,5009 | −0,3635 | −0,0476 | +0,0589 |
| Ca | +0,5514 | −1,5109 | −0,7904 | −0,6530 | −0,3371 | −0,2306 |
| Li | +0,7726 | −1,7315 | −1,0110 | −0,8736 | −0,5577 | −0,4512 |
| Mg | +1,0463 | −2,0058 | −1,2853 | −1,1479 | −0,8320 | −0,7255 |
| Be | +1,1385 | −2,0980 | −1,3775 | −1,2401 | −0,9242 | −0,8177 |

|                    |           |           |           |           |           |
|--------------------|-----------|-----------|-----------|-----------|-----------|
| $k(z)j$            | 1         | 2         | 2         | 2         | 2         |
|                    | $2E^o_{mR} =$ | $2E^o_{mR} =$ | $2E^o_{mR} =$ | $2E^o_{mR} =$ | $2E^2_{mR} =$ |
|                    | (+1,5992) | (−0,2560) | (−0,8060) | (−1,5260) | (−0,4600) |
| $\Omega_M$         |           |           |           |           |           |
| $\Omega_f$         | −0,5320   | +2,3864   | +2,9404   | +3,6604   | +2,5944   |
| $u\Omega_o$        |           |           |           |           |           |
| $E^o_{jx} - E_f^o$ | +0,266    | −0,6596   | −0,9366   | −1,2966   | −0,7636   |

I claim:

1. A multicomponent liquid electrolyte having a definite potential for electrolytic display cells, of the type based on at least one metal iodide dissolved in an anhydrous organic solvent, characterized in that it comprises the following three functional components:
   (a) a first metallic element $M_p$, yielding at least two corresponding iodides of different valences for ensuring the equilibrium between the reduced forms of iodine $I^-$ and $I_3^-$;
   (b) an iodide of a second metallic element $M_t$, in a practically completely dissociated state, for fixing the concentration of the electrolyte in the anionic species $I^-$, and
   (c) an iodide of a third metallic element $M_x$ constituting the display vehicle.

2. The electrolyte according to claim 1, wherein said element $M_p$ is selected from the group consisting of Tl, Cu, Hg, Au, Sn, Fe, Co, Ti, Cr, Mn, Sb and In.

3. The electrolyte according to claim 1 wherein said metallic element $M_t$ is selected from elements having a positive iodide ionization potential, in particular the alkali and alkaline earth metals.

4. The electrolyte according to claim 1 wherein said metallic element $M_x$ is selected from the group consisting of Zn, Cd, Tl, Pb, Cu, Ag, Hg, Au, Sn, Fe, Ni, Co, Ti, Cr, Mn, Sb and In.

5. The electrolyte according to claim 1, wherein a buffer equilibrium is established between the reduced species of iodine $I^-$ and $I_3^-$ on the one hand, and between iodine and the oxidized species of the $M_p$ element on the other, so that the electric neutrality of said electrolyte is assured and its potential is fixed and independent of the nature of the electrodes.

6. The electrolyte according to claim 1 wherein the functional component $M_p$ is selected from the group consisting of Cr, In, Ti, Sn and Cu; the functional component $M_x$ is selected from the group consisting of Zn, Cd, Tl, Pb, Mn, Sb, Fe, Ni, Co, Ag, Hg and Au, and the functional component $M_f$ is selected from elements with a positive iodide ionization potential.

7. The electrolyte according to claim 1 wherein the functional component $M_p$ is selected from the group consisting of Mn, Au, Tl, Hg, Sb, Co, Fe; the functional component $M_x$ is selected from the group consisting of Zn, Cd, Ni, Co, Pb, Sn, In and Ti, and the functional component $M_f$ is selected from elements having a positive iodide ionization potential.

8. The electrolyte according to claim 5, wherein said buffer equilibrium is ensured by the presence of a reference electrode.

9. The electrolyte according to claim 5, wherein the weight ratio $\omega$ of the buffer equilibrium and the functional equilibrium is equal to unity.

10. An electrolytic display cell containing, as the electrolytic display medium, a multicomponent liquid electrolyte having a definite potential according to claim 1.

11. The display cell according to claim 10, wherein the electrolyte has a neutral potential.

12. The display cell according to claim 11, wherein said cell comprises a reference electrode made of a metal selected from the group consisting of Ag, Hg, Au and Pt.

13. The display cell according to claims 10, 11 or 12, wherein the standard obliterating potential of the reference electrode $(d)°_R$ is higher than or equal to the standard lettering potential of the element $M_x$ in the electrolyte, so as to confer a permanent memory on the cell.

14. The display cell according to claims 10, 11 or 12, wherein the multicomponent electrolyte comprises several different $M_x$ elements having different display colors, so as to ensure a multicolored display.

* * * * *